(12) United States Patent
Chapman et al.

(10) Patent No.: US 6,220,806 B1
(45) Date of Patent: Apr. 24, 2001

(54) TWIN IMPRESSION PUSH NUT

(75) Inventors: James Stephen Chapman, Omaha, NE (US); William Charles Clark, Lee's Summit, MO (US); Jeffrey Dale Nielson, Elkhorn, NE (US); Ross Job Thompson, Bridgewater, NJ (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/276,017

(22) Filed: Mar. 25, 1999

(51) Int. Cl.$^7$ ............................................. F16B 21/18
(52) U.S. Cl. ............................ 411/526; 411/84; 411/528
(58) Field of Search ............................ 411/525, 526, 411/84, 520, 528, 529

(56) References Cited

U.S. PATENT DOCUMENTS

| | | | | |
|---|---|---|---|---|
| 2,144,350 | * | 1/1939 | Swanstrom | 411/84 |
| 2,503,854 | * | 4/1950 | Trainor | 411/520 |
| 2,763,031 | * | 9/1956 | Rekettye | 411/525 |
| 3,290,109 | * | 12/1966 | Vanegas | 411/520 |
| 3,510,823 | * | 5/1970 | Cervenka et al. | 411/520 |
| 3,648,559 | * | 3/1972 | Hudnall | 85/7 |
| 4,725,177 | * | 2/1988 | Becker | 411/525 |
| 4,728,236 | * | 3/1988 | Kraus | 411/437 |
| 4,826,379 | | 5/1989 | Norden . | |
| 4,860,513 | * | 8/1989 | Whitman | 52/410 |
| 5,195,860 | | 3/1993 | Steyn . | |
| 5,423,647 | * | 6/1995 | Suzuki | 411/431 |
| 5,502,942 | * | 4/1996 | Gras et al. | 52/511 |
| 5,803,692 | | 9/1998 | Postadan . | |
| 5,833,422 | | 11/1998 | Haga et al. . | |

* cited by examiner

*Primary Examiner*—Lynne H. Browne
*Assistant Examiner*—John B. Walsh
(74) *Attorney, Agent, or Firm*—Duane Morris & Heckscher LLP; Steven E. Koffs

(57) ABSTRACT

A push nut fastener has first and second gripping openings. The first gripping opening is substantially circular and the second gripping opening is substantially rectangular. The substantially circular gripping opening has a plurality of blades or finger-like engagement portions extending from the outer circumference of the substantially circular gripping opening towards the center of the substantially circular gripping opening. The substantially rectangular gripping opening has a plurality of blades or finger-like engagement portions extending from the outer perimeter of the substantially rectangular gripping opening towards the center of the substantially rectangular gripping opening. The substantially rectangular gripping opening includes at least two blades or finger-like engagement portions, a respective blade extending from each of two opposing sides of the substantially rectangular gripping opening. The push nut may have flanges formed at two opposing ends of the member. The flanges may be formed integrally from the same piece of material as the push nut fastener. The flanges may have unequal lengths, to differentiate one end of the push nut fastener from the other end. The push nut fastener may be included in electrical components, for example in a DSX jack. An exemplary digital signal cross-connect jack has a respective pair of posts extending from each side, with a respective push nut fastened to each respective pair of posts.

18 Claims, 3 Drawing Sheets

TWIN IMPRESSION PUSH NUT

FIELD OF THE INVENTION

The invention relates to fasteners generally, and more specifically, to push nut fastener.

DESCRIPTION OF THE RELATED ART

Push nut fasteners are well known and widely used in the art. They are used in a multitude of applications, from furniture to auto parts. Push nut fasteners are reliable, inexpensive, and provide an alternative to threaded fasteners such as bolts and screws. Exemplary push nut fasteners are described in U.S. Pat. Nos. 4,826,379 to Norden, 5,195,860 to Steyn, 5,803,692 to Postadan and 5,833,422 to Haga et al., all of which are incorporated by reference herein, in their entireties.

Typically, a push nut fastener is used in conjunction with an elongate cylindrical post which has no threads. The push nut has a hole or gripping opening for receiving the post. The gripping opening typically includes a plurality of blades or teeth extending into the gripping opening for contacting and securing the post. The blades of the gripping opening typically form a shape like a truncated cone. These teeth are constructed in such a way that the push nut easily slides onto the post, but is very difficult to slide in the opposite direction or remove.

Prior art push nut fasteners typically include a single hole or gripping opening formed therein. If multiple gripping openings are included on a single body, it may be difficult to align the push nut with two separate posts. A push nut which can accommodate more than one post without the attendant alignment problems is desired.

SUMMARY OF THE INVENTION

The present invention is a push nut fastener having first and second gripping openings formed therein, wherein the first gripping opening is substantially circular and the second gripping opening is substantially rectangular.

DETAILED DESCRIPTION OF THE EXEMPLARY EMBODIMENT

Figure 3:
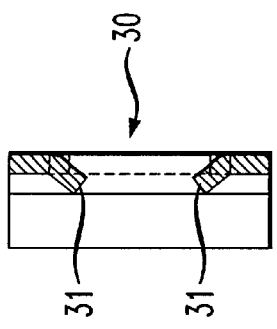
FIG. 3 is a cross-sectional view of the push nut fastener of FIG. 1, taken along section line 3—3.
Figure 1:
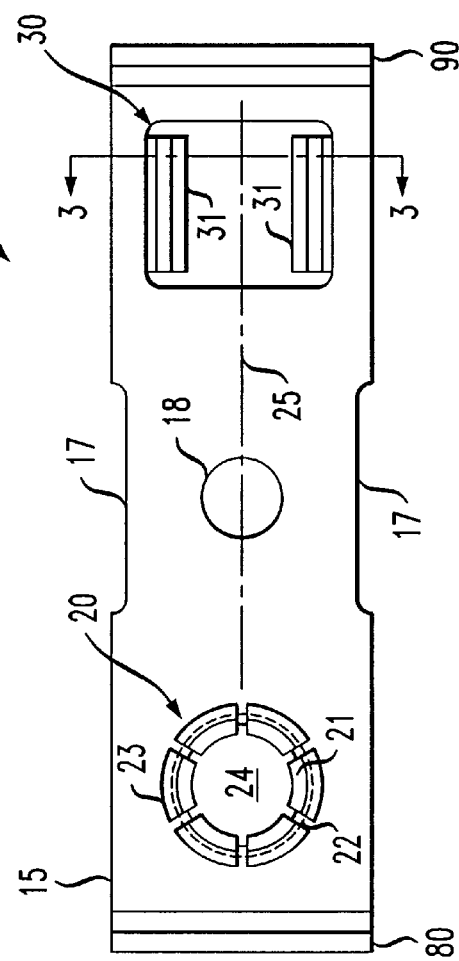
FIG. 1 is a plan view of a push nut fastener according to the present invention.
Figure 2:
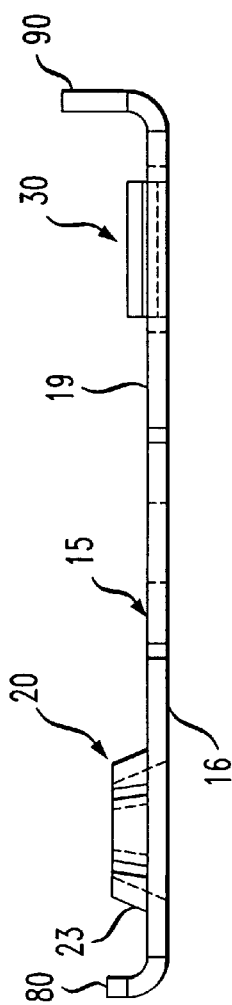
FIG. 2 is a side elevation view of the push nut fastener of FIG. 1.

FIGS. 1–3 show an exemplary push nut fastener 10 according to the present invention. The invention is a push nut fastener 10 that includes multiple holes 20 and 30 for securing the fastener to more than one cylindrical post, pin, shaft, or stud 110 (hereinafter referred to collectively as "posts") at a time. The push nut fastener 10 is suitable for fastening to electrical equipment.

Figure 4:
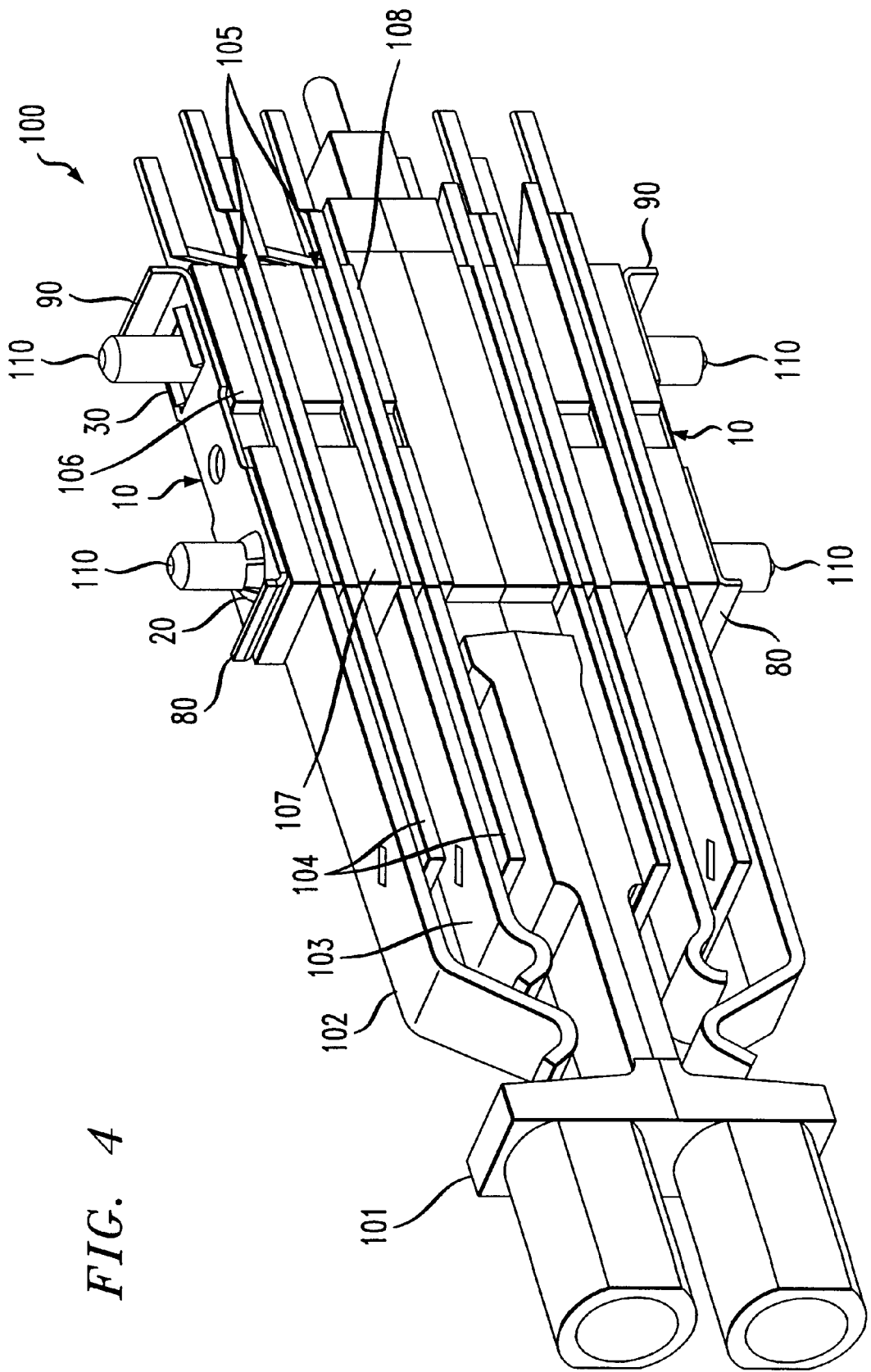
FIG. 4 is an isometric view of a jack assembly secured by the push nut fastener of FIG. 1.

The push nut fastener 10 includes at least two holes or gripping openings, 20 and 30. The push nut fastener 10 works in conjunction with a pair of posts 110 (shown in FIGS. 4–6), onto which the push nut 10 is attached. As shown in FIG. 4, a respective push nut fastener 10 may be attached to each side of the pair of posts 110, so that an item may be secured between the two push nuts 10.

Figure 5:
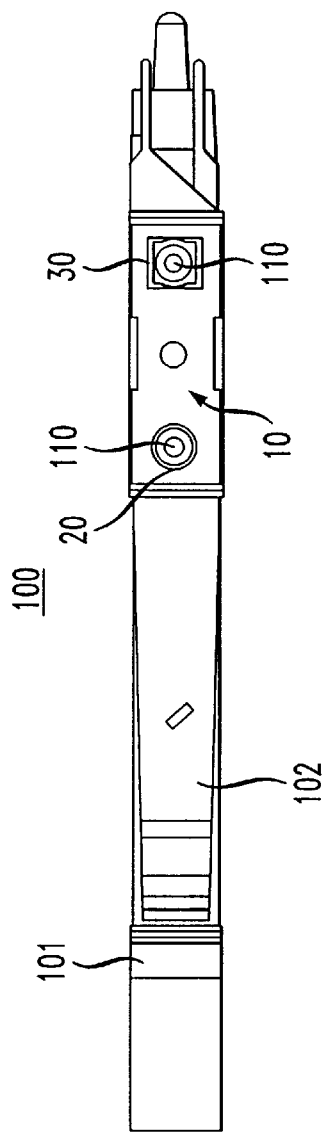
FIG. 5 is a plan view of the jack assembly of FIG. 4.
Figure 6:
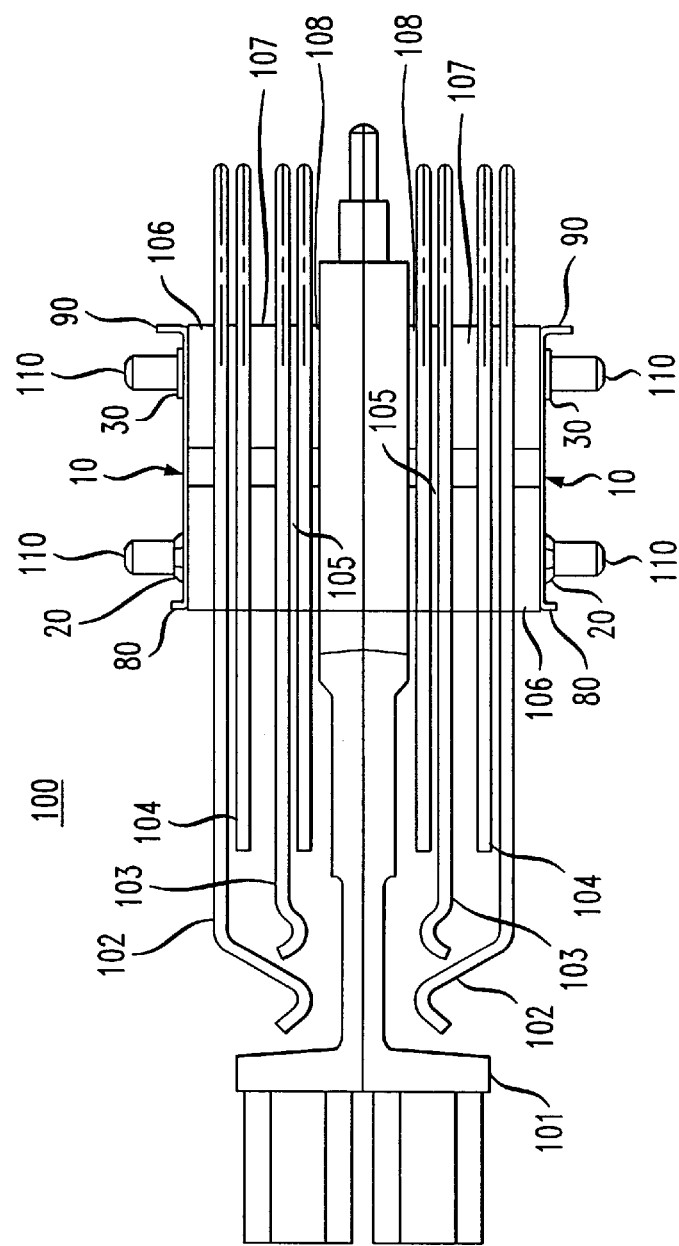
FIG. 6 is a side elevation view of the jack assembly of FIG. 4.

FIGS. 1–3 illustrate the push nut fastener 10, and FIGS. 4–6 show a digital signal cross-connect (DSX) jack 100 including two fasteners 10.

Referring again to FIGS. 1 and 2, the push nut fastener 10 has a member 15 having at least one engaging surface 16. The engaging surface 16 engages a corresponding surface on the device to which the push nut 10 is attached. The exemplary member 15 is a relatively thin plate having both a substantially flat engaging surface (bottom surface 16) and a substantially flat top surface 19.

For example, the fastener 10 may be formed from a single piece of SAE # 1050 spring steel of about 0.38 millimeter (0.015 inch) thickness. An exemplary fabrication method is stamping.

One of ordinary skill recognizes that the shape of the engaging surface can be any shape conforming to the part that is engaged by the engaging surface. Thus, for example, if the fastener is to engage a surface having an offset or "dog-leg" shape, then the engaging surface may also have a corresponding offset shape.

The fastener 10 has a substantially circular gripping opening 20 and a substantially rectangular gripping opening 30 formed in an engaging surface of the member 15. The gripping openings 20 and 30 retain a post 110, pin, stud or the like in position.

Circular gripping opening 20 has a plurality of blades or finger-like engagement portions 21 which extend from the outer circumference of the gripping opening 20 towards a central portion of the gripping opening, and which are separated by notches 22. The blades 21 extend upwardly and inwardly from the upper surface of the member 15, so that a post 110 or similar member (shown in FIGS. 4–6) can be secured tightly in the inner hole 24 created by the blades 21. An exemplary angle of the blades may be about 45 degrees, but other angles may be used, as understood by those skilled in the art. The blades 21 are preferably equidistant from one another, although this feature is optional. The blades 21 are preferably formed so as to have an equal length and extend an equal distance away from the surface of the flat member 15. The push nut 10 shown in FIG. 1 has six blades 21.

One of ordinary skill in the art recognizes that any number of blades or finger-like engagement portions may be used, as long as the number of blades or finger-like engagement portions chosen is sufficient to tightly hold a post 110. For example, U.S. Pat. No. 5,833,422, incorporated by reference herein, shows that four blades may be used.

The circular gripping opening 21 may be varied in accordance with any conventional rotationally symmetrical push nut gripping opening design previously known in the art, with respect to the number, size, angle, and spacing of the blades or finger-like engagement portions. Preferred circular gripping openings 21 provide high retention strength to prevent the push nut 10 from sliding or being pulled off of post 110 (FIGS. 4–6).

The rectangular gripping opening 30 also includes a plurality of blades or finger-like engagement portions 31, which extend from the sides of the gripping opening 30 towards the center of opening 30. These blades or finger-like engagement portions 31, like blades 21, extend upwardly and inwardly from the outer perimeter of the gripping opening 30. This is best shown with reference to FIG. 3, which is a cross sectional view of the fastener 10, taken along section line 3—3 of FIG. 1. The blades 31 extend approximately horizontally from the flat member 15 and then extend upwardly at approximately a 45 degree angle above the surface of the flat member 15. The blades 31 of the rectangular member create an inner rectangular area for tightly securing a post or similar member therebetween.

In the push nut 10 shown in FIGS. 1–3, two blades 31 are included in the rectangular gripping opening 30, however, one of ordinary skill in the art recognizes that any number of blades 31 may be used, as long as the number of blades chosen is sufficient to tightly hold the post 110. If each of the two sides of opening 30 includes more than one blade 31, it is preferred, but not required, that the blades 31 have the same size. If each of the two sides of opening 30 includes more than two blades 31, it is preferred, but not required, that the blades 31 be uniformly spaced.

The fastener 10 may also include flanges 80 and 90 which extend away from the surface of the member 15 in a direction perpendicular to surface 16. Flanges 80 and 90 may be formed from the same piece of material as member 15, at opposite ends of the member 15. The flanges 80 and 90 may be curved with respect to the surface of the fastener 10. The exemplary flange portion 90 extends a greater length away from the surface of the fastener 10 than does flange portion 80. As explained below, the differently sized flanges 80 and 90 assist in the automated installation of the fastener 10.

Member 15 has a narrow central portion formed by two indentations 17, and a central hole 18. The indentations 17 and hole 18 are optional, and are not required for the push nut 10 to function.

An advantage of the invention is the presence of two push nut gripping openings in a single fastener 10. Because the fastener 10 has two gripping openings 20 and 30, it prevents rotation of the fastener. Rotation of the fastener (which is possible if there is only a single opening) is undesirable, because it could potentially cause a short circuit if a portion of the rotated fastener contacts a conductor.

Gripping opening 20 positions its corresponding post 110 at a specific position, so that the center axis of the post 110 is substantially located at the center of opening 20. If a twin push nut fastener were to include two circular type gripping openings 20, it would be difficult to accommodate variations in the post separation distance with such a push nut. Such variations could cause increased assembly forces, deformed and possibly damaged blades having reduced retention strength, and undesirable bending stresses imparted onto the fixed posts. The present invention eliminates these concerns.

According to the invention, rectangular gripping opening 30 can grip its corresponding post 110 with the center axis of the post 110 located anywhere along the line 25 (shown in FIG. 1) that passes through the center of opening 20 and the center of opening 21. Thus, the rectangular gripping opening 30 accommodates variations in the placement of the post 110 or the distance between the pair of posts 110. Hence, even if the posts 110 are not always separated by the exact same distance, the push nut fastener 10 of the present invention can accommodate such variations.

Thus, greater manufacturing tolerances are accommodated, and less expensive manufacturing techniques may be used for an assembly that includes a twin push nut fastener according to the present invention. The increase in manufacturing tolerance can be extended both to the fabrication of the push nut fastener 10 itself, and the other components of the assembly that includes the fastener.

One of the benefits of the push nut fastener 10 of the present invention is that it is easily included in mass produced assemblies, whether manually or automatically assembled. The optional flanges 80 and 90 formed at the ends of the fastener 10 allow multiple fasteners to be placed end to end on a conveyor belt or similar device so that they do not overlie one another. Without the flanges 80 and 90, fasteners that are placed next to one another on a conveyor belt may overlie one another and impede the mass production process.

By optionally providing differently sized flanges 80 and 90, the respective ends of the push nut fastener 10 may be more easily recognized by automated equipment. They are also more easily recognized by a human for positioning the push nut fastener 10 in a location that is not visible to the installer.

Although the exemplary embodiments of FIGS. 1–6 include only one configuration for the circular gripping opening 20 and only one configuration for the rectangular gripping opening 30, push nuts according to the present invention may include gripping openings having blades or finger-like engagement portions such as those described and shown in U.S. Pat. Nos. 4,826,379, 5,195,860, 5,803,692 and 5,833,422, all of which are incorporated by reference herein.

A fastener according to the invention has many applications. One example is the application in an electrical jack. It is understood that the invention is not limited to this example, and is not limited to connectors or electrical devices at all. A fastener according to the invention has broad applications in assembling mechanical and electrical devices.

FIGS. 4–6 show an exemplary digital signal cross-connect (DSX) jack 100. DSX jacks are used for cross-connecting, temporary re-routing, and monitoring of digital circuits. The exemplary DSX jack includes a plurality of long flat conductive members, known as contact springs 102, 103 and 104. The springs 102–104 are separated from each other by spacers 105, 106 and 107. The innermost springs 104 are separated from the body casting 101 by pylon insulators 108.

In prior DSX jacks, the contact springs and spacers were held together by placing a single threaded screw or a set of screws through all of the contact springs and spacers, and securing the screw(s) with a nut-type fastener.

According to the present invention, the contact springs 102–104, spacers 105–107, and insulators 108 are more efficiently secured by two fasteners 10, each engaging a pair of unthreaded posts 110.

Two push nut fasteners 10, each having two gripping openings 20 and 30, are used to secure the contact springs 102–104, spacers 105–107, and insulators 108 of the jack 100. This is accomplished by attaching the push nut fasteners 10 to the ends of the posts 110 which extend away from the jack body 101. Once the push nuts 10 are pressed onto the posts 110, the conductive springs 102–104 and the spacers 105–107 are tightly held therebetween.

The posts 110 may be formed integrally as part of the of the DSX jack body casting 101, thus forming the casting 101 and posts 110 as a single cast body. Alternatively, the casting 101 may have two cylindrical holes, through which a pair of cylindrical posts 110 are inserted. Casting the posts 110 as apart of the body 101 of the jack 100 is advantageous, because it simplifies assembly, and controls the length of each post 110 that protrudes from the body 101.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A push nut fastener having a member, the member having an engaging surface with first and second gripping openings formed therein, each gripping opening capable of receiving a respective post, wherein the first gripping opening is substantially circular and the second gripping opening is substantially rectangular, the substantially rectangular gripping opening having a plurality of blades or finger-like engagement portions extending from each of two opposing sides of the substantially rectangular gripping opening towards the center of the substantially rectangular gripping opening, to thereby allow said one of the at least two posts to move in a plane of the engaging surface, said member further comprising flanges formed at two opposing ends of the member for grasping the member wherein the gripping openings are formed on the engaging surface such that they lie in between the flanges.

2. The push nut fastener of claim 1, wherein the substantially circular gripping opening has a plurality of blades or finger-like engagement portions extending from the outer circumference of the substantially circular gripping opening towards the center of the substantially circular gripping opening.

3. The push nut fastener of claim 1, wherein the flanges are formed integrally from the same piece of material as the push nut fastener.

4. The push nut fastener of claim 1, wherein the flanges have unequal lengths, thereby to differentiate one end of the push nut fastener from the other end.

5. The push nut fastener of claim 1, wherein the substantially rectangular gripping opening has blades or finger-like engagement portions on not more than two sides thereof, extending from the outer perimeter of the substantially rectangular gripping opening towards the center of the substantially rectangular gripping opening.

6. The push nut fastener of claim 1, wherein the flanges are curved with respect to the at least one engaging surface of the member.

7. An article comprising:

a body having at least two cylindrical posts extending from one side of said body; and at least one push nut fastener, said push nut fastener comprising a member having an engaging surface with first and second gripping openings formed therein, wherein the first gripping opening is substantially circular and the second gripping opening is substantially rectangular, the substantially rectangular gripping opening having a plurality of blades or finger-like engagement portions extending from each of two opposing sides of the substantially rectangular gripping opening towards the center of the substantially rectangular gripping opening, to thereby allow said one of the at least two posts to move in a plane of the engaging surface, said member further comprising flanges formed at two opposing ends of the member for grasping the member, wherein the gripping openings are formed on the engaging surface such that they lie in between the flanges, wherein the push nut fastener is attached to the body, so that the two posts protrude through the first and second gripping openings of the push nut.

8. The article of claim 7, wherein the substantially circular gripping opening has a plurality of blades or finger-like engagement portions extending from the outer circumference of the substantially circular gripping opening towards the center of the substantially circular gripping opening for tightly holding one of the at least two posts.

9. The article of claim 7, wherein the flanges are formed integrally from the same piece of material as the member.

10. The article of claim 7, wherein the flanges have unequal lengths, thereby to differentiate one end of the fastener from the other end.

11. The article of claim 8, wherein:

the body has at least two cylindrical posts extending from each of two opposing sides of said body, and the article includes at least two push nut fasteners, each push nut fastener comprising a member having an engaging surface with first and second gripping openings formed therein, wherein the first gripping opening is substantially circular and the second gripping opening is substantially rectangular, wherein the push nut fasteners are attached to the body on opposing sides thereof, so that the posts protrude through the substantially circular and substantially rectangular gripping openings formed in the push nuts.

12. The article of claim 1, wherein the article is a digital signal cross-connect jack.

13. The article of claim 7, wherein the cylindrical posts are circular cylinders.

14. The article of claim 7, wherein the flanges are curved with respect to the at least one engaging surface of the member.

15. A method of making a push nut fastener comprising:

forming at least two gripping openings in a member, one of said gripping openings being substantially circular, and the other of said gripping openings being substantially rectangular, the substantially rectangular gripping opening having a plurality of blades or finger-like engagement portions extending from each of two opposing sides of the substantially rectangular gripping opening towards the center of the substantially rectangular gripping opening, to thereby allow said one of the at least two posts to move in a plane of an engaging surface of the member; and forming flanges at two opposing sides of the member, said flanges being curved with respect to the at least one engaging surface of the member for grasping the member wherein the gripping openings are formed on the engaging surface such that they lie in between the flanges.

16. The method of claim 15, comprising the further step of:

forming a plurality of blades or finger-like engagement portions around the circumference of the substantially circular gripping opening, said blades or finger-like engagement portions extending from the outer circumference of the substantially circular gripping opening towards the center of the substantially circular gripping opening.

17. The method of claim 5, wherein the flanges are formed so as to be unequal in length, thereby to differentiate one end of the fastener from the other end of the fastener.

18. The method of claim 15, comprising the further step of:

forming blades or finger-like engagement portions on not more than two sides of the substantially rectangular gripping opening, extending from the perimeter of the substantially rectangular gripping opening towards the center of the substantially rectangular gripping opening.

* * * * *